United States Patent
Tu et al.

(10) Patent No.: US 8,411,425 B2
(45) Date of Patent: Apr. 2, 2013

(54) ADJUSTING MECHANISM FOR ADJUSTING A POSITION OF A SCREEN AND RELATED DISPLAY DEVICE

(75) Inventors: Cheng Tu, Taipei Hsien (TW); Huei-Huang Suen, Taipei Hsien (TW)

(73) Assignee: Aopen Inc., New Taipei (TW)

(*) Notice: Subject to any disclaimer, the term of this patent is extended or adjusted under 35 U.S.C. 154(b) by 308 days.

(21) Appl. No.: 12/894,150

(22) Filed: Sep. 30, 2010

(65) Prior Publication Data

US 2011/0228456 A1 Sep. 22, 2011

(30) Foreign Application Priority Data

Mar. 22, 2010 (TW) .............................. 99108323 A

(51) Int. Cl.
*H05K 5/00* (2006.01)
*H05K 7/00* (2006.01)
(52) U.S. Cl. .............. 361/679.21; 361/679.05; 248/917; 248/919; 248/920
(58) Field of Classification Search ............. 361/679.05, 361/679.21; 248/917, 919, 920
See application file for complete search history.

(56) References Cited

U.S. PATENT DOCUMENTS

| | | | | | |
|---|---|---|---|---|---|
| 5,751,548 A | * | 5/1998 | Hall et al. | ................. | 361/679.41 |
| 6,016,171 A | * | 1/2000 | Tsao | .............................. | 348/836 |
| 6,381,125 B1 | * | 4/2002 | Mizoguchi et al. | ...... | 361/679.08 |
| 6,381,128 B1 | * | 4/2002 | Kramer | .................... | 361/679.55 |
| 7,400,498 B2 | * | 7/2008 | Liang et al. | .............. | 361/679.55 |
| 7,561,414 B2 | * | 7/2009 | Li et al. | ...................... | 361/679.26 |
| 7,917,993 B2 | * | 4/2011 | Park | ................................ | 16/239 |
| 8,081,431 B2 | * | 12/2011 | Fan | ........................... | 361/679.05 |
| 2004/0011938 A1 | * | 1/2004 | Oddsen, Jr. | ................... | 248/393 |
| 2006/0022096 A1 | * | 2/2006 | Chan et al. | .................... | 248/129 |
| 2006/0118686 A1 | * | 6/2006 | Hsieh et al. | ................. | 248/276.1 |
| 2006/0238967 A1 | * | 10/2006 | Carson et al. | ................. | 361/681 |

FOREIGN PATENT DOCUMENTS

CN 201293190 Y 8/2009

OTHER PUBLICATIONS

Office action mailed on Jun. 29, 2012 for the China application No. 201010133887.3, p. 3 line 5-16.

* cited by examiner

*Primary Examiner* — Anthony Haughton
(74) *Attorney, Agent, or Firm* — Winston Hsu; Scott Margo

(57) ABSTRACT

An adjusting mechanism includes a stand, a vertical sliding component installed inside the stand in a slidable manner along a vertical direction relative to the stand so as to fix a vertical position of a screen. A plurality of slots is formed on a side of the vertical sliding component, and the vertical sliding component includes a plurality of inclined structures respectively formed nearby the plurality of slots. The adjusting mechanism further includes a vertical positioning device installed on a side of the stand for inserting into the slot of the vertical sliding component so as to fix the vertical position of the screen. The inclined structure is for pushing the vertical positioning device out of the slot.

16 Claims, 4 Drawing Sheets

ADJUSTING MECHANISM FOR ADJUSTING A POSITION OF A SCREEN AND RELATED DISPLAY DEVICE

BACKGROUND OF THE INVENTION

1. Field of the Invention

The present invention relates to an adjusting mechanism for adjusting a position of a screen, and more particularly, to an adjusting mechanism for adjusting a vertical position and a horizontal position of a screen.

2. Description of the Prior Art

Flat display device is currently a popular display device, where a liquid crystal display (LCD) device is characterized by lightweight, low power consumption, and low radiation. Because of these characteristics, the LCD device is widely applied in portable electronic products such as notebook computers and personal digital assistants (PDAs). LCD monitors are so desirable that they are replacing the cathode ray tube (CRT) monitors and traditional televisions. Generally, the LCD device includes a screen and an adjusting mechanism for adjusting a height of the screen. However, the conventional adjusting mechanism utilizes the gravity of the screen and a resilient recovering force generated by a spring, such as a constant force spring, to balance in equilibrium, so as to position the screen at a predetermined height conveniently. The constant force spring provides a constant force to adjust the height of the screen, and the screen can be positioned at any predetermined height as the gravity of the screen and the resilient recovering force of the constant force spring are balanced in equilibrium. However, the conventional adjusting mechanism with the constant force spring has complicated structure and expensive manufacturing cost. Thus, design of a screen adjusting mechanism with simple structure and low manufacturing cost is an important issue of the display mechanical design.

SUMMARY OF THE INVENTION

The present invention provides an adjusting mechanism for adjusting a position of a screen for solving above drawbacks.

According to the claimed invention, an adjusting mechanism includes a stand, and a vertical sliding component installed inside the stand in a slidable manner along a vertical direction relative to the stand so as to adjust a vertical position of a screen. A plurality of slots is formed on a side of the vertical sliding component, and the vertical sliding component includes a plurality of inclined structures respectively formed nearby the plurality of slots. The adjusting mechanism further includes a vertical positioning device installed on a side of the stand for inserting into the slot of the vertical sliding component so as to fix the vertical position of the screen, and the inclined structure is for pushing the vertical positioning device out of the slot.

According to the claimed invention, the stand includes at least one vertical track, and the vertical sliding component is installed inside the vertical track of the stand in a slidable manner along the vertical direction relative to the stand.

According to the claimed invention, an angle formed between the inclined structure and the slot is substantially less than 90 degrees.

According to the claimed invention, the vertical positioning device includes a fixing base installed on the side of the stand, a pin passing through the fixing base for inserting into the slot of the vertical sliding component and for being pushed by the inclined structure, a resilient component connected to the pin for driving the pin to insert into the slot of the vertical sliding component, and a handle connected to the resilient component for driving the resilient component.

According to the claimed invention, the adjusting mechanism further includes a horizontal sliding component installed inside the vertical sliding component in a slidable manner along a horizontal direction relative to the vertical sliding component so as to adjust a horizontal position of the screen. A plurality of positioning holes is formed on a side of the horizontal sliding component. The adjusting mechanism further includes a horizontal positioning device installed on a side of the vertical sliding component for inserting into the positioning hole on the horizontal sliding component so as to fix the horizontal position of the screen.

According to the claimed invention, the vertical sliding component further includes at least one horizontal track, and the horizontal sliding component is installed inside the horizontal track of the vertical sliding component in a slidable manner along the horizontal direction relative to the vertical sliding component.

According to the claimed invention, each positioning hole is a sunken part.

According to the claimed invention, the horizontal positioning device includes a fixing portion installed on the side of the vertical sliding component, a pin installed inside the fixing portion for passing through a hole on the vertical sliding component and inserting into the positioning hole on the horizontal sliding component, and a resilient component installed inside the fixing portion and connected to the pin for driving the pin to insert into the positioning hole on the horizontal sliding component.

According to the claimed invention, a display device includes a screen and an adjusting mechanism connected to the screen for adjusting a position of the screen. The adjusting mechanism includes a stand, and a vertical sliding component installed inside the stand in a slidable manner along a vertical direction relative to the stand so as to adjust a vertical position of the screen. A plurality of slots is formed on a side of the vertical sliding component, and the vertical sliding component comprising a plurality of inclined structures respectively formed nearby the plurality of slots. The adjusting mechanism further includes a vertical positioning device installed on a side of the stand for inserting into the slot of the vertical sliding component so as to fix the vertical position of the screen, and the inclined structure being for pushing the vertical positioning device out of the slot.

According to the claimed invention, an adjusting mechanism includes a stand, a vertical sliding component installed inside the stand in a slidable manner along a vertical direction relative to the stand so as to adjust a vertical position of a screen, and a horizontal sliding component installed inside the vertical sliding component in a slidable manner along a horizontal direction relative to the vertical sliding component so as to adjust a horizontal position of the screen. A plurality positioning holes is formed on a side of the horizontal sliding component. The adjusting mechanism further includes a horizontal positioning device installed on a side of the vertical sliding component for inserting into the positioning hole on the horizontal sliding component so as to fix the horizontal position of the screen.

According to the claimed invention, a display device includes a screen, and an adjusting mechanism connected to the screen for adjusting a position of the screen. The adjusting mechanism includes a stand, a vertical sliding component installed inside the stand in a slidable manner along a vertical direction relative to the stand so as to adjust a vertical position of a screen, and a horizontal sliding component installed inside the vertical sliding component in a slidable manner along a horizontal direction relative to the vertical sliding component so as to adjust a horizontal position of the screen. A plurality positioning holes is formed on a side of the horizontal sliding component. The adjusting mechanism further includes a horizontal positioning device installed on a side of the vertical sliding component for inserting into the positioning hole on the horizontal sliding component so as to fix the horizontal position of the screen.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
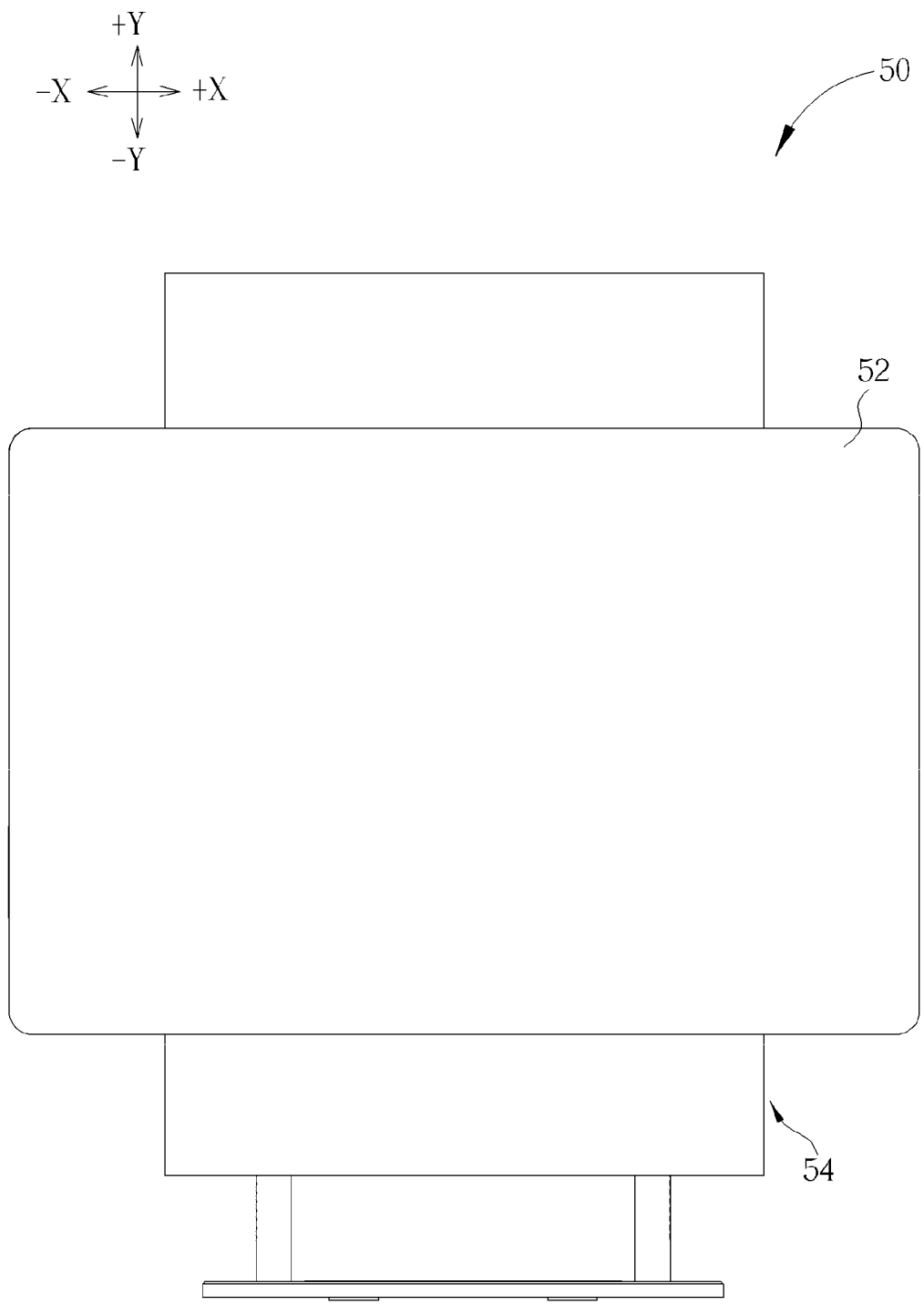
FIG. 1 and FIG. 2 are schematic drawings of a display device in different views according to a preferred embodiment of the present invention.
Figure 2:
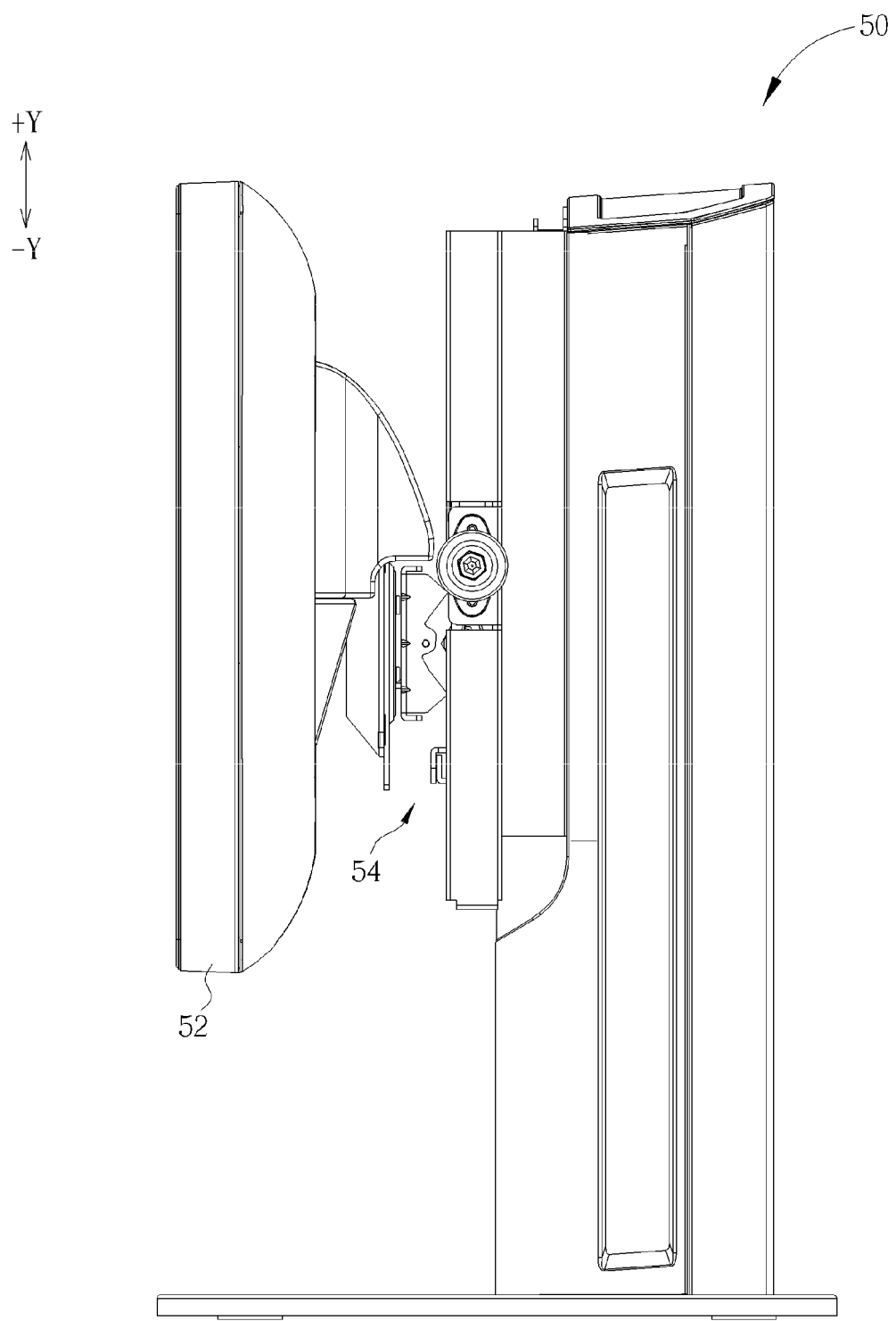

Please refer to FIG. 1 and FIG. 2. FIG. 1 and FIG. 2 are schematic drawings of a display device 50 in different views according to a preferred embodiment of the present invention. The display device 50 can be a liquid crystal display, an All-in-One desktop computer, and so on. The display device 50 includes a screen 52 and an adjusting mechanism 54 connected to the screen 52 for adjusting a vertical position and a horizontal position of the screen 52. That is to say, the adjusting mechanism 54 can adjust a height of the screen 52 along the ±Y direction and a horizontal position of the screen 52 along the ±X direction.

Figure 3:
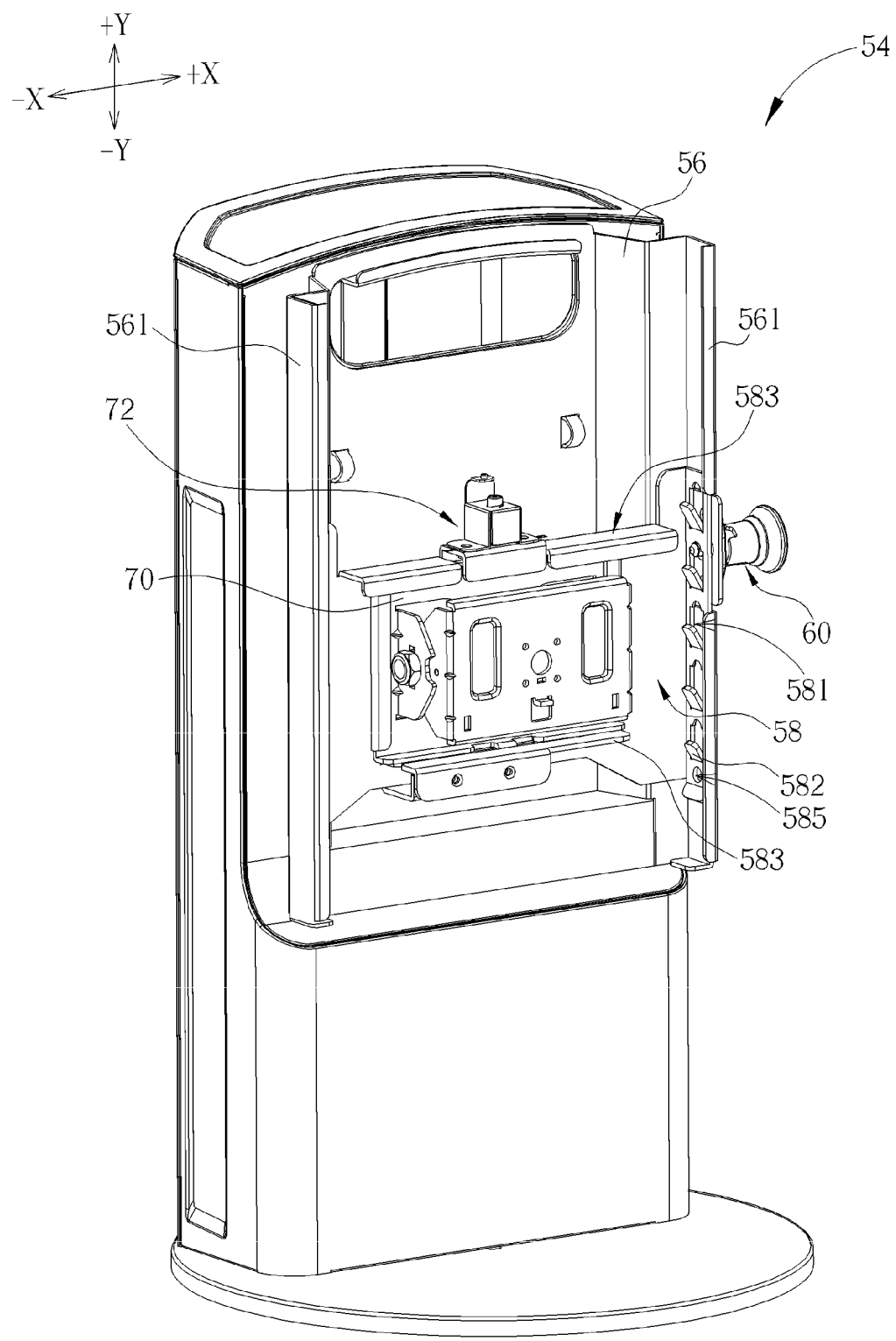
FIG. 3 is an assembly diagram of an adjusting mechanism according to the preferred embodiment of the present invention.
Figure 4:
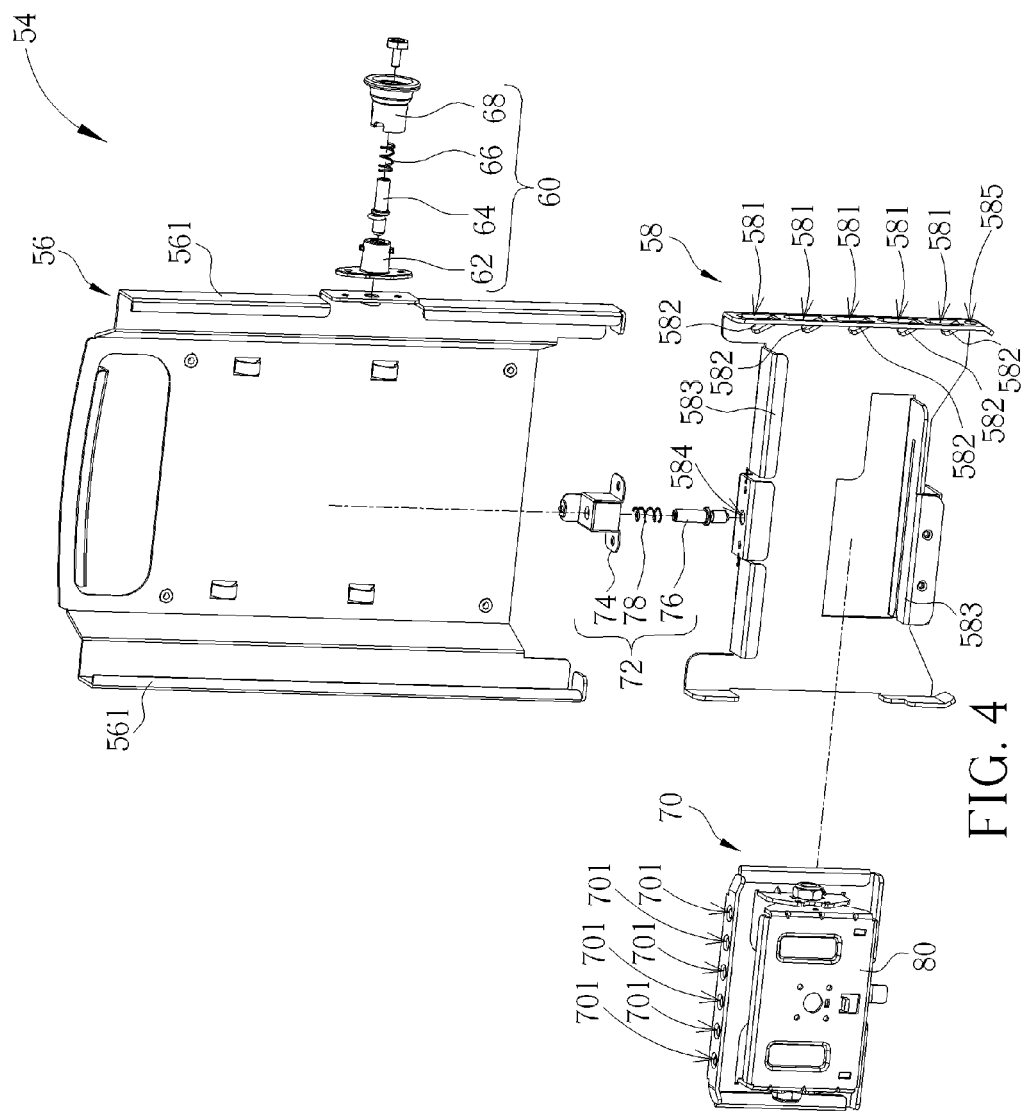
FIG. 4 is an exploded diagram of the adjusting mechanism according to the preferred embodiment of the present invention.

Please refer to FIG. 3 and FIG. 4. FIG. 3 is an assembly diagram of the adjusting mechanism 54 according to the preferred embodiment of the present invention. FIG. 4 is an exploded diagram of the adjusting mechanism 54 according to the preferred embodiment of the present invention. The screen 52 is omitted in FIG. 3 and FIG. 4 for illustrating the adjusting mechanism 54 clearly. The adjusting mechanism 54 includes a stand 56. Two vertical tracks 561 are disposed on two sides (a left side and a right side) of the stand 56, respectively. The adjusting mechanism 54 further includes a vertical sliding component 58 installed inside the vertical tracks 561 of the stand 56 in a slidable manner along the vertical direction (±Y direction) relative to the stand 56, so as to adjust the vertical position of the screen 52. The vertical tracks 561 can constrain movement of the vertical sliding component 58 to slide along the vertical direction. A plurality of slots 581 is disposed on a side of the vertical sliding component 58, and the vertical sliding component 58 includes a plurality of inclined structures 582 respectively disposed nearby the plurality of slots 581. The inclined structure 582 can be a bending structure made of iron material. In this embodiment, an angle formed between the inclined structure 582 and the slot 581 can be substantially less than or greater than 90 degrees, and it depends on design demand. In addition, two horizontal tracks 583 are disposed on two sides (an upper side and a lower side) of the vertical sliding component 58, respectively. The adjusting mechanism 54 further includes a vertical positioning device 60 installed on a side of the stand 56 for selectively inserting into one of the plurality of slots 581 of the vertical sliding component 58, so as to fix the vertical position of the screen 52. The inclined structure 582 pushes the vertical positioning device 60 out of the slot 581. The vertical positioning device 60 can preferably includes a fixing base 62 installed on the side of the stand 56. The vertical positioning device 60 can further includes a pin 64 passing through the fixing base 62 for inserting into the slot 581 of the vertical sliding component 58 and for being pushed by the inclined structure 582. The fixing base 62 can fix the pin 64 so that the pin 64 does not depart from the vertical sliding component 58. The vertical positioning device 60 can further include a resilient component 66 connected to an end of the pin 64 for driving the pin 64 to insert into the slot 581 of the vertical sliding component 58. The resilient component 66 can be a spring. The vertical positioning device 60 further includes a handle 68 connected to the resilient component 66 for driving the resilient component 66. For example, the handle 68 can pull the resilient component 66 so as to draw the pin 64 from the slot 581.

In addition, for adjusting the horizontal position (±X direction) of the screen 52, the adjusting mechanism 54 further includes a horizontal sliding component 70 installed inside the horizontal tracks 583 of the vertical sliding component 58 in a slidable manner along the horizontal direction (±X direction) relative to the vertical sliding component 58, so as to adjust the horizontal position of the screen 52. The horizontal tracks 583 can constrain movement of the horizontal sliding component 70 to slide along the horizontal direction. Besides, a plurality of positioning holes 701 is disposed on a side of the horizontal sliding component 70. Each positioning hole 701 can be a sunken part, such as an indentation formed by stamping. The adjusting mechanism 54 further includes a horizontal positioning device 72 installed on a side of the vertical sliding component 58 for inserting into one of the plurality of positioning holes 701 on the horizontal sliding component 70, so as to fix the horizontal position of the screen 52. The horizontal positioning device 72 can preferably include a fixing portion 74 installed on the side of the vertical sliding component 58. The horizontal positioning device 72 further includes a pin 76 installed inside the fixing portion 74 for passing through a hole 584 on the vertical sliding component 58 and inserting into the positioning hole 701 on the horizontal sliding component 70. The horizontal positioning device 72 further includes a resilient component 78 installed inside the fixing portion 74 and connected to an end of the pin 76 for driving the pin 76 to insert into the positioning hole 701 on the horizontal sliding component 70. The resilient component 78 can be a spring.

Detailed description of the adjusting mechanism 54 is introduced as follows. When the vertical position of the screen 52 is adjusted, such as arising the height of the screen 52, the screen 52 is moved along the +Y direction to overcome the gravity of the screen 52. At this time, a fixing plate 80 connected to the screen 52 drives the horizontal sliding component 70, which is connected to the fixing plate 80, to move along the +Y direction, and the horizontal sliding component 70 drives the vertical sliding component 58 to move along the +Y direction simultaneously. As the screen 52 is positioned, the pin 64 of the vertical positioning device 60 inserts into one of the plurality of slots 581 of the vertical sliding component 58, so as to fix the vertical position of the screen 52. With the movement of the vertical sliding component 58 along the +Y direction, the pin 64 inserting into the slot 581 contacts the corresponding inclined surface 582 disposed on a side of the slot 581, and the inclined structure 582 pushes the pin 64 along the +X direction, so as to compress the resilient component 66 connected to the pin 64 until the pin 64 separates from the inclined structure 582 and contacts a lateral wall of the vertical sliding component 58. Meanwhile, the resilient component 66 is in maximal compression. However, when the vertical sliding component 58 moves along the +Y direction continuously, the pin 64 is not pressed as aligning with the next slot 581 and the resilient component 66 provides a resilient recovering force to the pin 64 for driving the pin 64 to insert into the next slot 581, so as to fix the vertical position of the screen 52 again. Therefore, the height of the screen 52 can be adjusted by driving the pin 64 to insert into the different slots 581 step by step. When the screen 52 is at the highest position, the pin 64 can insert into a hole 585 formed on the lowest of the side of the vertical sliding component 58. Numbers and dispositions of the slots 581 and the holes 585 can depend on design demand. Furthermore, the adjusting mechanism 54 can include more than one vertical positioning device 60 and a combination of the slots 581 and the inclined structures 582, which means the corresponding slots 581 and the corresponding inclined structures 582 can be disposed on the other side of the vertical sliding component 58, and the adjusting mechanism 54 also can include another vertical positioning device 60 for fixing the vertical position of the screen 52 accordingly.

On the other hand, when lowering the screen 52, the handle 68 of the vertical positioning device 60 can be pulled along the +X direction, so as to drive the resilient component 66 to draw the pin 64 out of the slot 581, and then the pin 64 contacts against the fixing base 62. Meanwhile, the screen 52 is unlocked. With movement of the screen 52 along the −Y direction, the handle 68 of the vertical positioning device 60 can be released after the vertical position of the screen 52 is confirmed. At this time, the resilient component 66 provides the resilient recovering force to the pin 64 and the handle 68, so that the pin 64 and the handle 68 move along the −X direction, and the pin 64 inserts into the corresponding slot 581 so as to fix the vertical position of the screen 52. Thus, the adjusting mechanism 54 can drive the pin 64 to insert into the different slots 581 for adjusting the height of the screen 52.

The display device 50 has a function for rotating the screen 52, such as rotating the screen 52 into 90 degrees. However, it is inconvenient to view the screen 52 as the screen 52 does not locate at a central position after rotation. Therefore, the horizontal sliding component 70 can adjust the horizontal position of the screen 52 along the ±X direction, so as to locate the screen 52 at the central position. When the screen 52 moves along the ±X direction for adjusting the horizontal position of the screen 52, the fixing plate 80 connected to the screen 52 drive the horizontal sliding component 70, which is fixed on the fixing plate 80, to move along the ±X direction. When the screen 52 is positioned, the pin 76 of the horizontal positioning device 72 inserts into one of the plurality of positioning holes 701 on the horizontal sliding component 70, so as to fix the horizontal position of the screen 52. The pin 76 departs from the positioning hole 701 as the horizontal sliding component 70 moves along the ±X direction continuously, and the upper side of the horizontal sliding component 70 pushes the pin 76 to move along the +Y direction, so as to compress the resilient component 78 connected to the pin 76. Meanwhile, the resilient component 78 is in maximal compression. With the movement of the horizontal sliding component 70 along the ±X direction, the pin 76 is not pressed when aligning with the next positioning hole 701, so that the resilient component 78 provides the resilient recovering force to the pin 76 for driving the pin 76 to insert into the next positioning hole 701, so as to fix the horizontal position of the screen 52. Therefore, the horizontal position of the screen 52 can be adjusted by driving the pin 64 to insert into the different positioning holes 701, such as fixing the screen 52 at the central position. Numbers and dispositions of the positioning holes 701 depend on design demand. In addition, the adjusting mechanism 54 can include more than one combination of the horizontal position device 72 and the positioning holes 701, which means the corresponding positioning holes 701 can be formed on the other side of the horizontal sliding component 70, and the adjusting mechanism 54 can also include another horizontal positioning device 72 for fixing the horizontal position of the screen 52 accordingly.

Comparing to the prior art, the present invention provides the adjusting mechanism for adjusting the vertical position and the horizontal position of the screen. The present invention has advantages of simply structure and low manufacturing cost. The adjusting mechanism of the present invention can conform to the screens with different specifications, so that assembly of the adjusting mechanism is convenient and easy.

Those skilled in the art will readily observe that numerous modifications and alterations of the device and method may be made while retaining the teachings of the invention.

What is claimed is:

1. An adjusting mechanism comprising:
    a stand;
    a vertical sliding component installed inside the stand in a slidable manner along a vertical direction relative to the stand so as to adjust a vertical position of a screen, a plurality of slots being formed on a side of the vertical sliding component, and the vertical sliding component comprising a plurality of inclined structures respectively formed nearby the plurality of slots; and
    a vertical positioning device separating from the screen and installed on a side of the stand for inserting into the slot of the vertical sliding component so as to fix the vertical position of the screen, and the inclined structure being for pushing the vertical positioning device out of the slot, the vertical positioning device comprising:
        a fixing base installed on the side of the stand;
        a pin passing through the fixing base for inserting into the slot of the vertical sliding component and for being pushed by the inclined structure;
        a resilient component connected to the pin for driving the pin to insert into the slot of the vertical sliding component; and
        a handle connected to the resilient component for driving the resilient component.

2. The adjusting mechanism of claim 1, wherein the stand comprises at least one vertical track, and the vertical sliding component is installed inside the vertical track of the stand in a slidable manner along the vertical direction relative to the stand.

3. The adjusting mechanism of claim 1, wherein an angle formed between the inclined structure and the slot is substantially less than 90 degrees.

4. The adjusting mechanism of claim 1 further comprising:
    a horizontal sliding component installed inside the vertical sliding component in a slidable manner along a horizontal direction relative to the vertical sliding component so as to adjust a horizontal position of the screen, and a plurality of positioning holes being formed on a side of the horizontal sliding component; and
    a horizontal positioning device installed on a side of the vertical sliding component for inserting into the positioning hole on the horizontal sliding component so as to fix the horizontal position of the screen.

5. The adjusting mechanism of claim 4, wherein the vertical sliding component further comprises at least one horizontal track, and the horizontal sliding component is installed inside the horizontal track of the vertical sliding component in a slidable manner along the horizontal direction relative to the vertical sliding component.

6. The adjusting mechanism of claim 4, wherein each positioning hole is a sunken part.

7. The adjusting mechanism of claim 4, wherein the horizontal positioning device comprises:
- a fixing portion installed on the side of the vertical sliding component;
- a pin installed inside the fixing portion for passing through a hole on the vertical sliding component and inserting into the positioning hole on the horizontal sliding component; and
- a resilient component installed inside the fixing portion and connected to the pin for driving the pin to insert into the positioning hole on the horizontal sliding component.

8. A display device comprising:
- a screen; and
- an adjusting mechanism connected to the screen for adjusting a position of the screen, the adjusting mechanism comprising:
  - a stand;
  - a vertical sliding component installed inside the stand in a slidable manner along a vertical direction relative to the stand so as to adjust a vertical position of the screen, a plurality of slots being formed on a side of the vertical sliding component, and the vertical sliding component comprising a plurality of inclined structures respectively formed nearby the plurality of slots; and
  - a vertical positioning device separating from the screen and installed on a side of the stand for inserting into the slot of the vertical sliding component so as to fix the vertical position of the screen, and the inclined structure being for pushing the vertical positioning device out of the slot, the vertical positioning device comprising:
    - a fixing base installed on the side of the stand;
    - a pin passing through the fixing base for inserting into the slot of the vertical sliding component and for being pushed by the inclined structure;
    - a resilient component connected to the pin for driving the pin to insert into the slot of the vertical sliding component; and
    - a handle connected to the resilient component for driving the resilient component.

9. The display device of claim 8, wherein the stand comprises at least one vertical track, and the vertical sliding component is installed inside the vertical track of the stand in a slidable manner along the vertical direction relative to the stand.

10. The display device of claim 8, wherein an angle formed between the inclined structure and the slot is substantially less than 90 degrees.

11. The display device of claim 8 further comprising:
- a horizontal sliding component installed inside the vertical sliding component in a slidable manner along a horizontal direction relative to the vertical sliding component so as to adjust a horizontal position of the screen, and a plurality of positioning holes being formed on a side of the horizontal sliding component; and
- a horizontal positioning device installed on a side of the vertical sliding component for inserting into the positioning hole on the horizontal sliding component so as to fix the horizontal position of the screen.

12. The display device of claim 11, wherein the vertical sliding component further comprises at least one horizontal track, and the horizontal sliding component is installed inside the horizontal track of the vertical sliding component in a slidable manner along the horizontal direction relative to the vertical sliding component.

13. The display device of claim 11, wherein each positioning hole is a sunken part.

14. The display device of claim 11, wherein the horizontal positioning device comprises:
- a fixing portion installed on the side of the vertical sliding component;
- a pin installed inside the fixing portion for passing through a hole on the vertical sliding component and inserting into the positioning hole on the horizontal sliding component; and
- a resilient component installed inside the fixing portion and connected to the pin for driving the pin to insert into the positioning hole on the horizontal sliding component.

15. An adjusting mechanism comprising:
- a stand;
- a vertical sliding component installed inside the stand in a slidable manner along a vertical direction relative to the stand so as to adjust a vertical position of a screen, a plurality of slots being formed on a side of the vertical sliding component, and the vertical sliding component comprising a plurality of inclined structures formed nearby the plurality of slots;
- a horizontal sliding component installed inside the vertical sliding component in a slidable manner along a horizontal direction relative to the vertical sliding component so as to adjust a horizontal position of the screen, and a plurality positioning holes being formed on a side of the horizontal sliding component;
- a horizontal positioning device installed on a side of the vertical sliding component for inserting into the positioning hole on the horizontal sliding component so as to fix the horizontal position of the screen; and
- a vertical positioning device separating from the screen and installed on a side of the stand for inserting into the slot of the vertical sliding component so as to fix the vertical position of the screen, and the inclined structure being for pushing the vertical positioning device out of the slot.

16. A display device comprising:
- a screen; and
- an adjusting mechanism connected to the screen for adjusting a position of the screen, the adjusting mechanism comprising:
  - a stand;
  - a vertical sliding component installed inside the stand in a slidable manner along a vertical direction relative to the stand so as to adjust a vertical position of a screen, a plurality of slots being formed on a side of the vertical sliding component, and the vertical sliding component comprising a plurality of inclined structures formed nearby the plurality of slots;
  - a horizontal sliding component installed inside the vertical sliding component in a slidable manner along a horizontal direction relative to the vertical sliding component so as to adjust a horizontal position of the screen, and a plurality positioning holes being formed on a side of the horizontal sliding component;
  - a horizontal positioning device installed on a side of the vertical sliding component for inserting into the positioning hole on the horizontal sliding component so as to fix the horizontal position of the screen; and a vertical positioning device separating from the screen and installed on a side of the stand for inserting into the slot of the vertical sliding component so as to fix the vertical position of the screen, and the inclined structure being for pushing the vertical positioning device out of the slot.

* * * * *